United States Patent
Ishikawa et al.

(10) Patent No.: US 8,941,792 B2
(45) Date of Patent: Jan. 27, 2015

(54) LIQUID CRYSTAL DISPLAY DEVICE AND MANUFACTURING METHOD THEREOF

(71) Applicant: Japan Display Inc, Chiba-ken (JP)

(72) Inventors: Tomokazu Ishikawa, Mobara (JP); Osamu Nagashima, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/034,799

(22) Filed: Sep. 24, 2013

(65) Prior Publication Data
US 2014/0022482 A1 Jan. 23, 2014

Related U.S. Application Data

(63) Continuation of application No. 13/296,264, filed on Nov. 15, 2011, now Pat. No. 8,547,514.

(30) Foreign Application Priority Data

Nov. 18, 2010 (JP) .................................. 2010-257428

(51) Int. Cl.
 G02F 1/1343 (2006.01)
 G02F 1/1368 (2006.01)
 G02F 1/1362 (2006.01)
(52) U.S. Cl.
 CPC ........ G02F 1/1368 (2013.01); G02F 1/134363 (2013.01); *G02F 1/136227* (2013.01); *G02F 2001/134318* (2013.01); *G02F 2001/136231* (2013.01); *G02F 2001/136236* (2013.01); *G02F 2001/136295* (2013.01)

USPC .............................................. 349/43; 349/141

(58) Field of Classification Search
None
See application file for complete search history.

(56) References Cited

U.S. PATENT DOCUMENTS

| 2003/0197187 A1 | 10/2003 | Kim et al. |
| 2006/0139548 A1* | 6/2006 | Ahn ............................ 349/141 |
| 2008/0002126 A1 | 1/2008 | Lim et al. |
| 2009/0081820 A1 | 3/2009 | Park et al. |

FOREIGN PATENT DOCUMENTS

| JP | 2005-157016 | 6/2005 |
| KR | 2007-0036511 | 4/2007 |

* cited by examiner

*Primary Examiner* — Thanh-Nhan P Nguyen
(74) *Attorney, Agent, or Firm* — Antonelli, Terry, Stout & Kraus, LLP.

(57) ABSTRACT

A liquid crystal display device includes a first insulation substrate and a second insulation substrate which hold a liquid crystal material therebetween, a pixel electrode, a common electrode, a thin film transistor which has a semiconductor layer, a first electrode connected with a video signal line, and a second electrode connected with the pixel electrode. The semiconductor layer overlaps and is in physical contact with the pixel electrode, and a part of the pixel electrode, a part of the semiconductor layer, and a part of the second electrode are stacked at an overlapping portion.

6 Claims, 6 Drawing Sheets

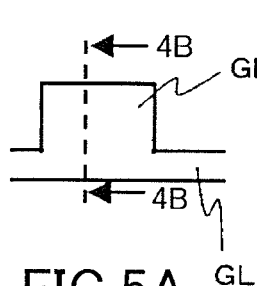
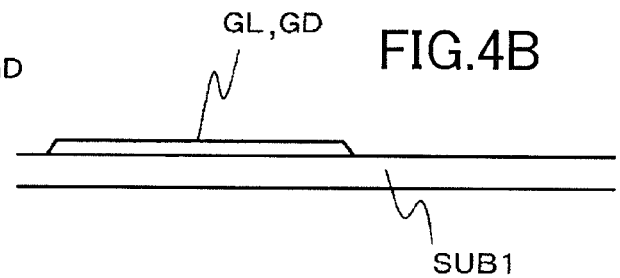
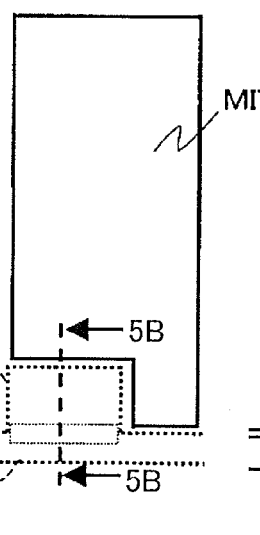
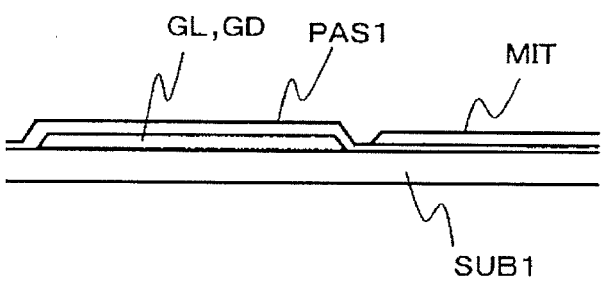
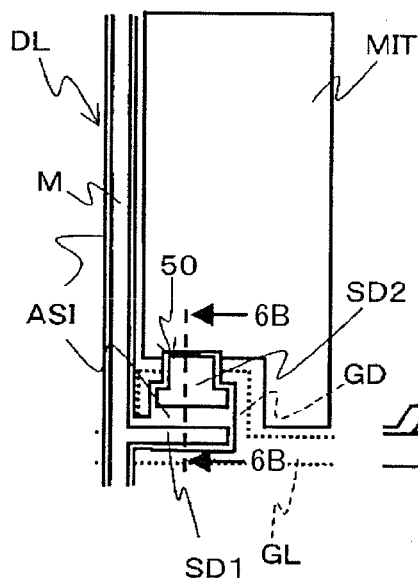
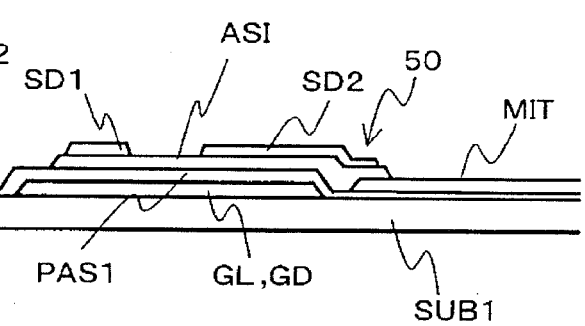

LIQUID CRYSTAL DISPLAY DEVICE AND MANUFACTURING METHOD THEREOF

CROSS-REFERENCE TO RELATED APPLICATION

This application is a continuation of U.S. application Ser. No. 13/296,264, filed Nov. 15, 2011, now U.S. Pat. No. 8,547,514, the contents of which are incorporated herein by reference.

The present application claims priority from Japanese application JP2010-257428 filed on Nov. 18, 2010, the content of which is hereby incorporated by reference into this application.

BACKGROUND OF THE INVENTION

1. Field of the Invention

The present invention relates to a liquid crystal display device and a manufacturing method thereof.

2. Description of the Related Art

Conventionally, as a liquid crystal display device used in a television receiver set or the like, there has been known a liquid crystal display device where a switching element such as a thin film transistor is provided for each pixel, and driving of a desired pixel is controlled by a switching operation of the switching element. Such a liquid crystal display device includes a liquid crystal display panel where a liquid crystal material is held between a TFT substrate on which thin film transistors are formed and a counter substrate on which color filters are formed.

With respect to the TFT substrate and the counter substrate, usually, 6 to 8 sheets of photo masks are used for manufacturing the TFT substrate. Exposure treatment using these photo masks and development, film peeling and etching treatment relating to the exposure treatment are factors which increase a manufacturing cost. That is, when a large number of photo masks are used, a manufacturing cost of a liquid crystal display device is pushed up. Accordingly, to reduce the manufacturing cost, there has been a demand for a liquid crystal display device and a manufacturing method thereof which can reduce the number of photo masks used in the manufacture of the liquid crystal display device to 5 or 4 sheets.

With respect to a liquid crystal display device, there has been known a liquid crystal display device having the constitution where source electrodes, pixel electrodes and semiconductor layers are present on the same layer, and the source electrodes and the pixel electrodes are directly connected with each other in a conductive manner not via contact holes.

In the liquid crystal display device having such a constitution, among defects which occur in the manufacturing steps, the number of disconnection defects of video signal lines is large. That is, the liquid crystal display device has a drawback that the disconnection defects of the video signal lines lower a yield in the manufacture of the liquid crystal display device.

As a cause of such disconnection defects of the video signal lines, considered is a case where when the pixel electrodes are formed after forming the video signal lines, due to the impregnation of an etchant used at the time of forming the pixel electrodes, the video signal lines are dissolved. To overcome the above-mentioned drawback, there has been proposed a liquid crystal display device and a manufacturing method thereof which can reduce the number of photo masks and also can reduce disconnection defects of video signal lines (see JP 2005-157016 A, for example).

In the liquid crystal display device and the manufacturing method thereof described in JP 2005-157016 A, the number of photo masks is reduced by performing collective etching treatment which uses a half exposure technique, and the number of disconnection defects of video signal lines is reduced by forming video signal lines after forming pixel electrodes.

However, in the liquid crystal display device and the manufacturing method thereof described in JP 2005-157016 A, scanning signal lines are formed after forming semiconductor layers and hence, the semiconductor layer is formed with a width equal to or slightly narrower than a width of a gate electrode whereby the requirement on accuracy of mask alignment at the time of forming a source-drain line formed on the semiconductor layer becomes strict thus causing a drawback that a process design becomes difficult eventually.

It may be possible to cope with such a drawback by reducing a film thickness of a resist pattern using oxygen plasma treatment with strengthened anisotropy or by making a design in which a size change amount of the resist pattern is taken into account. However, the difficulty in process design remains even in such a case.

SUMMARY OF THE INVENTION

The present invention has been made under the above-mentioned circumstances, and it is an object of the present invention to provide a liquid crystal display device and a manufacturing method thereof which can enhance a yield while reducing a manufacturing cost, and can provide a process design easily.

To overcome the above-mentioned drawbacks and to achieve the above-mentioned object, according to one aspect of the present invention, there is provided a liquid crystal display device which includes: a first insulation substrate and a second insulation substrate which hold a liquid crystal material therebetween; scanning signal lines formed over a surface of the first insulation substrate on a liquid-crystal-material side; a first insulation layer which is formed over the scanning signal lines and on the surface of the first insulation substrate on the liquid-crystal-material side; semiconductor layers and pixel electrodes which are formed over the surface of the first insulation layer on the liquid-crystal-material side; and a second insulation layer which is formed between the pixel electrodes and a common electrode, wherein the liquid crystal display device further includes: source electrodes each of which includes an overlapping portion which is a stacked portion constituted of the semiconductor layer and a metal layer formed over a surface of the semiconductor layer on the liquid-crystal-material side and is a portion overlapping a surface of the pixel electrode on the liquid-crystal-material side; video signal lines each of which is formed of a stacked portion constituted of the metal layer and the semiconductor layer; and drain electrodes each of which is formed of a stacked portion constituted of the metal layer and the semiconductor layer, and opening portions each of which exposes a joining portion which is a portion leading to a surface of the pixel electrode on the liquid crystal material side from a surface of the source electrode on the liquid crystal material side via an edge portion of the overlapping portion are formed in the second insulation layer, and a conductive film which is formed into the common electrode is formed over the joining portion exposed by the opening portion.

In the liquid crystal display device having the above-mentioned constitution, the conductive film covers the whole surface of the opening portion.

To overcome the above-mentioned drawbacks and to achieve the above-mentioned object, according to another aspect of the present invention, there is provided a method of manufacturing a liquid crystal display device which includes: a first insulation substrate and a second insulation substrate which hold a liquid crystal material therebetween; scanning signal lines formed over a surface of the first insulation substrate on a liquid-crystal-material side; a first insulation layer which is formed over the scanning signal lines and on the surface of the first insulation substrate on the liquid-crystal-material side; semiconductor layers and pixel electrodes which are formed over the surface of the first insulation layer on the liquid-crystal-material side; and a second insulation layer which is formed between the pixel electrodes and a common electrode, the method including a collectively forming step in which, after the pixel electrodes are formed over the surface of the first insulation layer on the liquid crystal material side, by collectively applying etching treatment to the semiconductor layer and a metal layer, source electrodes each of which includes an overlapping portion which is a stacked portion constituted of the semiconductor layer and the metal layer formed over a surface of the semiconductor layer on the liquid-crystal-material side and is a portion overlapping a surface of the pixel electrode on the liquid-crystal-material side, video signal lines each of which is formed of a stacked portion constituted of the metal layer and the semiconductor layer, and drain electrodes each of which is formed of a stacked portion constituted of the metal layer and the semiconductor layer are formed; an opening forming step in which opening portions each of which exposes a joining portion which is a portion leading to a surface of the pixel electrode on the liquid crystal material side from a surface of the source electrode on the liquid crystal material side via an edge portion of the overlapping portion are formed in the second insulation layer; and a conductive film forming step in which a conductive film which is formed into the common electrode is formed over the joining portion exposed by the opening portion.

In the method of manufacturing a liquid crystal display device having the above-mentioned constitution, the conductive film which is formed in the step of forming the conductive film covers the whole surface of the opening portion.

Also in the method of manufacturing a liquid crystal display device having the above-mentioned constitution, the step of forming the opening portion is performed along with the formation of openings in the second insulation layer other than the opening portions.

In the liquid crystal display device of the present invention, the source electrodes each of which includes the overlapping portion which is the stacked portion constituted of the semiconductor layer and the metal layer formed over the surface of the semiconductor layer on the liquid-crystal-material side and is the portion overlapping the surface of the pixel electrode on the liquid-crystal-material side; the video signal lines each of which is formed of the stacked portion constituted of the metal layer and the semiconductor layer; and the drain electrodes each of which is formed of the stacked portion constituted of the metal layer and the semiconductor layer are formed, and the opening portions each of which exposes the joining portion which is the portion leading to the surface of the pixel electrode on the liquid crystal material side from the surface of the source electrode on the liquid crystal material side via the edge portion of the overlapping portion are formed in the second insulation layer, and the conductive film which is formed into the common electrode is formed over the joining portion exposed by the opening portion.

Due to such a constitution, after forming the pixel electrodes, the video signal lines, the semiconductor layers, the drain electrodes and the source electrodes can be formed by collective etching treatment.

Further, the semiconductor layers can be formed after the formation of the scanning signal lines, the accuracy in mask alignment can be easily acquired compared to a case where the scanning signal lines are formed after forming the semiconductor layers.

Accordingly, the liquid crystal display device according to the present invention can enhance a yield while reducing a manufacturing cost, and can provide a process design easily.

The method of manufacturing a liquid crystal display device according to the present invention includes: the collective forming step in which, after the pixel electrodes are formed over the surface of the first insulation layer on the liquid crystal material side, by collectively applying etching treatment to the semiconductor layer and the metal layer, the source electrodes each of which includes the overlapping portion which is the stacked portion constituted of the semiconductor layer and the metal layer formed over the surface of the semiconductor layer on the liquid-crystal-material side and is a portion overlapping the surface of the pixel electrode on the liquid-crystal-material side, the video signal lines each of which is formed of the stacked portion constituted of the metal layer and the semiconductor layer, and the drain electrodes each of which is formed of the stacked portion constituted of the metal layer and the semiconductor layer are formed; the opening portion forming step in which the opening portions each of which exposes the joining portion which is the position leading to the surface of the pixel electrode on the liquid crystal material side from the surface of the source electrode on the liquid crystal material side via the edge portion of the overlapping portion are formed in the second insulation layer; and the conductive film forming step in which the conductive film which is formed into the common electrode is formed over the joining portion exposed by the opening portion.

Due to such a constitution, after forming the pixel electrodes, the video signal lines, the semiconductor layers, the drain electrodes and the source electrodes can be formed by collective etching treatment.

Further, the semiconductor layers can be formed after the formation of the scanning signal lines and hence, the accuracy in mask alignment can be easily acquired compared to a case where the scanning signal lines are formed after forming the semiconductor layers.

Accordingly, the method of manufacturing the liquid crystal display device according to the present invention can enhance a yield while reducing a manufacturing cost, and can provide a process design easily.

BRIEF DESCRIPTION OF THE DRAWINGS

FIG. 4A is a view showing a manufacturing step of a TFT substrate shown in FIG. 3, and FIG. 4B is a cross-sectional view of the structure shown in FIG. 4A taken along a line 4B-4B;

FIG. 5A is a view showing a manufacturing step of the TFT substrate shown in FIG. 3, and FIG. 5B is a cross-sectional view of the structure shown in FIG. 5A taken along a line 5B-5B;

FIG. 6A is a view showing a manufacturing step of the TFT substrate shown in FIG. 3, and FIG. 6B is a cross-sectional view of the structure shown in FIG. 6A taken along a line 6B-6B;

DETAILED DESCRIPTION OF THE INVENTION

Hereinafter, a preferred embodiment of a liquid crystal display device and a manufacturing method thereof according to the present invention are explained in detail in conjunction with drawings.

Embodiment

Figure 1:
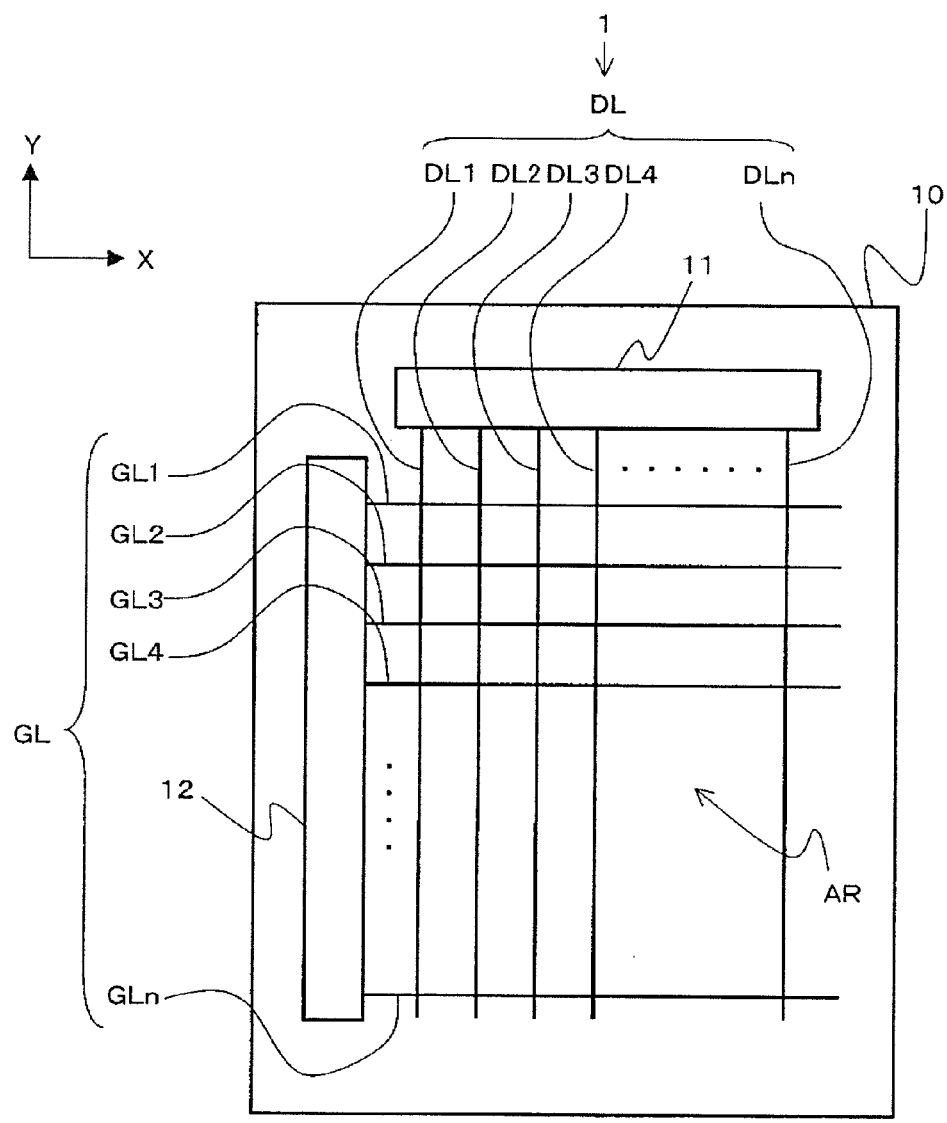
FIG. 1 is a schematic view showing the constitution of a liquid crystal display device according to an embodiment of the present invention.

FIG. 1 is a schematic view showing the constitution of a liquid crystal display device 1 according to an embodiment of the present invention.

The liquid crystal display device 1 includes a liquid crystal display panel 10, video signal lines DL, scanning signal lines GL, a data drive circuit 11, a scanning drive circuit 12, a backlight not shown in the drawing and a control part not shown in the drawing.

The liquid crystal display panel 10 includes the plural video signal lines DL ($DL_1, \ldots, DLi, \ldots, DLn$: i and n being natural numbers) which extend in the Y direction in the drawing, and the plural scanning signal lines GL ($GL_1, \ldots, GLj, \ldots, GLm$: j and m being natural numbers) which extend in the X direction in the drawing. A display region AR is formed in a region of the liquid crystal display panel 10 including a center portion.

The data drive circuit 11 is provided for generating a video signal (gradation voltage) inputted to the plural video signal lines DL respectively.

The scanning drive circuit 12 is provided for sequentially inputting a scanning signal to the plural scanning signal lines GL. The data drive circuit 11 and the scanning drive circuit 12 are electrically connected to the liquid crystal display panel 10 via a flexible printed circuit board or the like not shown in the drawing which is connected to an outer peripheral portion of the liquid crystal display panel 10.

The backlight not shown in the drawing is realized by light emitting diodes or the like, and is provided for irradiating light to the liquid crystal display panel 10 from a back surface side of the liquid crystal display panel 10

The control part not shown in the drawing is realized by a CPU or the like, and the control part is electrically connected to respective parts of the liquid crystal display device 1 including the data drive circuit 11, the scanning drive circuit 12 and the backlight not shown in the drawing so as to control an operation of the whole liquid crystal display device 1.

Figure 2:
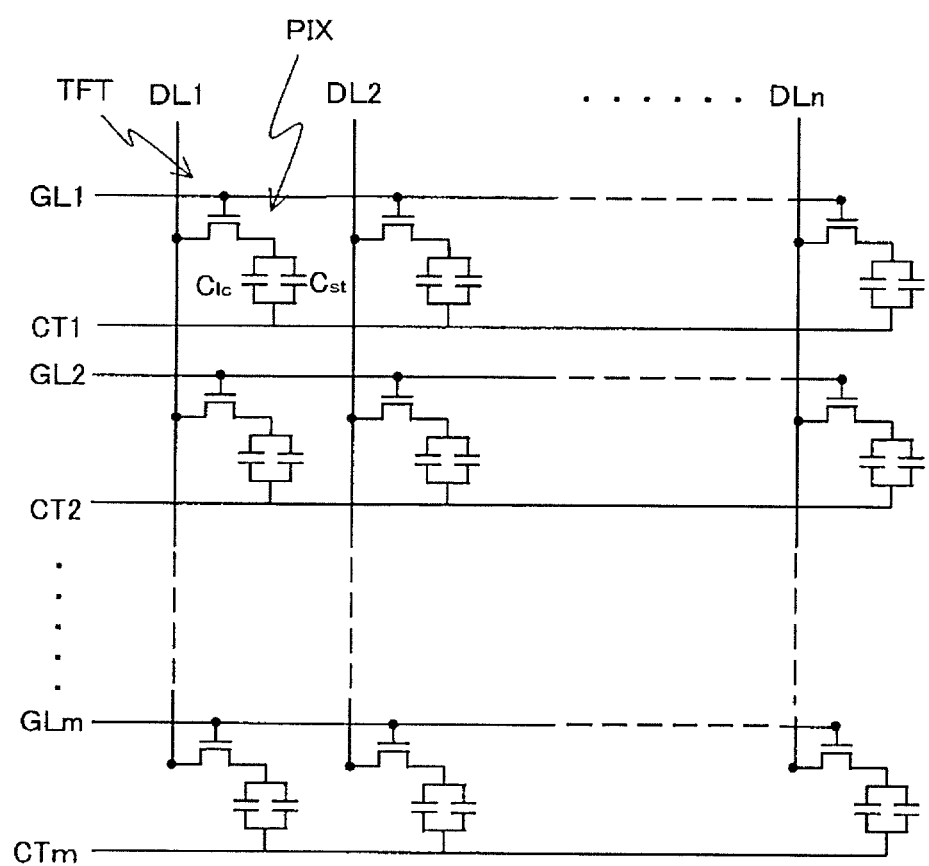
FIG. 2 is an equivalent circuit diagram for explaining the constitution of the pixel of a liquid crystal display panel shown in FIG. 1.

Next, the constitution of pixels of the liquid crystal display panel 10 is explained. FIG. 2 is an equivalent circuit diagram for explaining the constitution of the pixel PIX of the liquid crystal display panel 10 shown in FIG. 1.

In the liquid crystal display panel 10, as shown in FIG. 2, a region surrounded by a pair of neighboring scanning signal lines GL and a pair of neighboring video signal lines DL forms the pixel PIX. Each pixel PIX is provided with a thin film transistor TFT. Each pixel PIX includes a pixel electrode MIT, a common electrode CT ($CT_1, \ldots, CTj, \ldots, CTm$: j and m being natural numbers), a capacitance element Cst which is a storage capacitance formed by an insulation layer sandwiched between these electrodes, and a capacitance element Clc formed by a liquid crystal layer.

Figure 3:
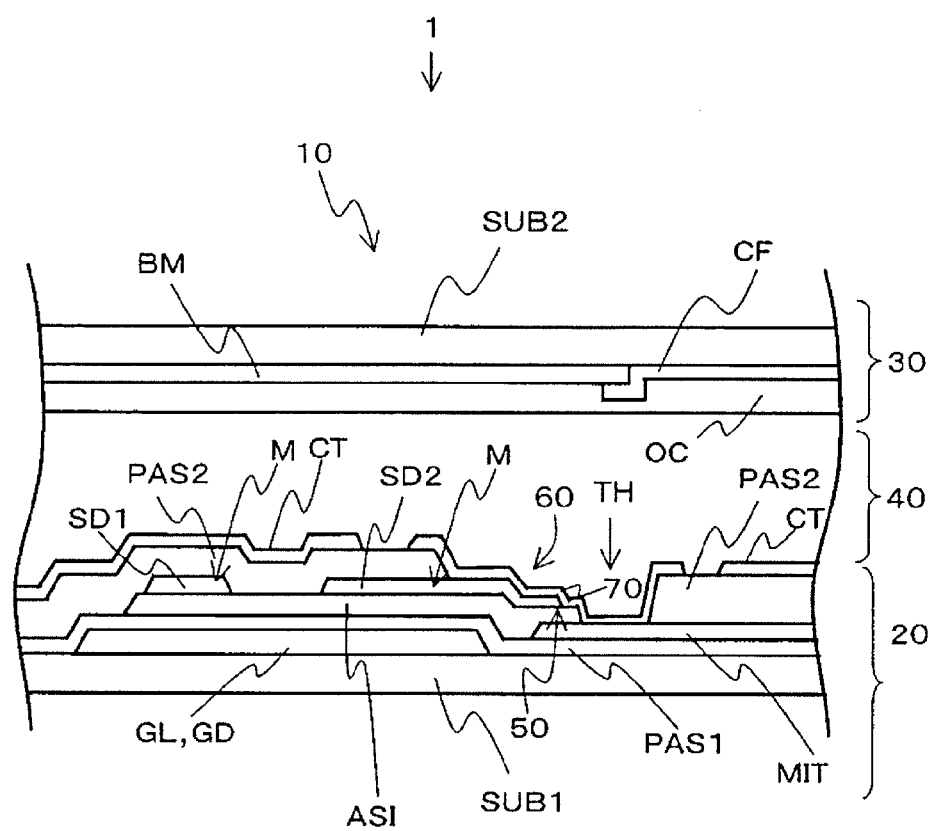
FIG. 3 is a cross-sectional view of an essential part of the liquid crystal display panel shown in FIG. 1.

The liquid crystal display panel 10 is explained in detail using FIG. 3. FIG. 3 is a cross-sectional view of an essential part of the liquid crystal display panel 10 shown in FIG. 1.

In the liquid crystal display panel 10, as shown in FIG. 3, a liquid crystal material 40 is sealed between a TFT substrate 20 and a counter substrate 30. In the TFT substrate 20, the scanning signal lines GL are formed on a surface of an insulation substrate SUB1 formed of a glass substrate or the like on a liquid-crystal-material-40 side. The scanning signal lines GL are formed by applying etching treatment to a conductive film made of aluminum or the like using a photolithography method, for example.

A first insulation layer PAS1 which constitutes a gate insulation layer is formed over the scanning signal lines GL. The first insulation layer PAS1 is a layer formed of a silicon nitride (SiN) film.

On the first insulation layer PAS1, semiconductor layers ASI each of which is a layer constituted of the pixel electrode MIT and an amorphous silicon (a-Si) film are formed.

Over the semiconductor layer ASI, the video signal line DL (drain electrode SD1) which is formed of a stacked portion constituted of a metal layer M and the semiconductor layer ASI, and a source electrode SD2 which is formed of a stacked portion constituted of the metal layer M and the semiconductor layer ASI in the same manner as the video signal line DL (drain electrode SD1) are formed.

The pixel electrode MIT is formed by etching a conductive film having high optical transmissivity such as an ITO (Indium Tin Oxide) film. Further, above the pixel electrode MIT, the common electrode CT is formed by way of a second insulation layer PAS2. The pixel electrode MIT is formed in a region where the pixel electrode MIT overlaps the common electrode CT as viewed in a plan view in a matted planar shape.

The common electrode CT is formed of a conductive film having high optical transmissivity such as an ITO film, and is an electrode formed in a region where the common electrode CT overlaps the pixel electrode MIT as viewed in a plan view. Plural slits SL having the longitudinal direction thereof arranged in the extending direction of the video signal line DL are formed in the common electrode CT. The common electrode CT is formed by applying etching treatment to the conductive film made of ITO or the like using a photolithography method. An alignment film not shown in the drawing is formed over the common electrode CT. The alignment film not shown in the drawing is made of a polyimide-based resin or the like, and is provided for aligning liquid crystal molecules in the predetermined direction.

The constitution which connects the pixel electrode MIT and the source electrode SD2 with each other in a conductive state is explained here.

The TFT substrate 20 includes overlapping portions 50, joining portions 60 and contact holes TH.

The overlapping portion 50 is a stacked portion constituted of the semiconductor layer ASI and the metal layer M formed on a surface of the semiconductor layer ASI on a liquid-crystal-material-40 side, and also is a portion which overlaps a surface of the pixel electrode MIT on a liquid-crystal-material-40 side. As shown in FIG. 3, the source electrode SD2 is formed including such an overlapping portion 50.

The joining portion 60 is a portion which leads to the surface of the pixel electrode MIT on the liquid-crystal-material-40 side from a surface of the source electrode SD2 of the overlapping portion 50 on a liquid-crystal-material-40 side via an edge portion of the overlapping portion 50.

The contact hole TH is a square columnar opening portion formed in the second insulation layer PAS2 and is provided for exposing the joining portion 60.

A conductive film 70 made of ITO which forms the common electrode CT is formed over the whole surface of the contact hole TH.

Accordingly, the conductive film 70 is formed on the joining portion 60 exposed by the contact hole TH so that the pixel electrode MIT and the source electrode SD2 are connected with each other in a conductive state.

In the counter substrate 30, a light blocking film BM which is referred to as a black matrix and color filters CF are formed on a surface of an insulation substrate SUB2 formed of a glass substrate or the like. The light blocking film BM is formed into a grid pattern by etching a conductive film or an insulation film having light blocking property, for example, such that the respective pixels PIX are separated from each other.

The color filters CF are, for example, formed by applying etching treatment to an insulation film using a photolithography method, and are formed in opening regions of the light blocking film BM in a state where a filter allocated to a display of R (red), a filter allocated to a display of G (green) and a filter allocated to a display of B (blue) are arranged periodically. An alignment film not shown in the drawing is formed over the light blocking film BM and the color filters CF by way of an overcoat layer OC, for example.

Next, manufacturing steps of the TFT substrate 20 shown in FIG. 3 are explained in conjunction with FIG. 4A to FIG. 8B. FIG. 4A, FIG. 5A, FIG. 6A, FIG. 7A and FIG. 8A are views showing the manufacturing steps of the TFT substrate 20 shown in FIG. 3, and FIG. 4B, FIG. 5B, FIG. 6B, FIG. 7B and FIG. 8B are cross-sectional views of the structures shown in FIG. 4A, FIG. 5A, FIG. 6A, FIG. 7A and FIG. 8A taken along a line 4B-4B, a line 5B-5B, a line 6B-6B, a line 7B-7B and a line 8B-8B respectively. 5 sheets of photo masks are used in the manufacture of the TFT substrate 20.

Firstly, the scanning signal lines GL and gate electrodes GD are formed on the surface of the insulation substrate SUB1 on the liquid-crystal-material-40 side (see FIG. 4A and FIG. 4B). To be more specific, a metal layer made of an aluminum material or the like is formed on the surface of the insulation substrate SUB1 on the liquid-crystal-material-40 side and, thereafter, etching treatment is applied to the metal layer using a photolithography method thus forming the scanning signal lines GL and the gate electrodes GD.

Next, the first insulation layer PAS1 is formed, and the pixel electrodes MIT is formed over the first insulation layer PAS1 (see FIG. 5A and FIG. 5B). The pixel electrodes MIT are formed such that an ITO film is formed over the first insulation layer PAS1 and, thereafter, etching treatment is applied to the ITO film using a photolithography method.

Subsequently, the video signal lines DL, the drain electrodes SD1 and the source electrodes SD2 are formed (see FIG. 6A and FIG. 6B). The drain electrode SD1 and the source electrode SD2 are formed such that the semiconductor layer ASI is formed over the first insulation layer PAS1 and the pixel electrode MIT, the metal layer M made of an aluminum material or the like is formed over the semiconductor layer ASI, and collective etching treatment is applied to the semiconductor layer ASI and the metal layer M using a half exposure technique. Due to such treatment, the overlapping portion 50 which is a stacked portion constituted of the semiconductor layer ASI and the source electrode SD2 and also is a portion which overlaps an upper surface of the pixel electrode MIT is formed.

Since etching treatment is applied to the semiconductor layer ASI and the metal layer M collectively, the video signal lines DL, the source electrode SD2 and the drain electrode SD1 are formed of the stacked portion which is constituted of the metal layer M and the semiconductor layer ASI respectively. Accordingly, in the step of forming the video signal lines DL, the drain electrodes SD1 and the source electrodes SD2, the semiconductor layer ASI is present between the source electrode SD2 and the pixel electrode MIT and hence, the pixel electrode MIT and the source electrode SD2 are not connected with each other in a conductive state.

Figure 7A:
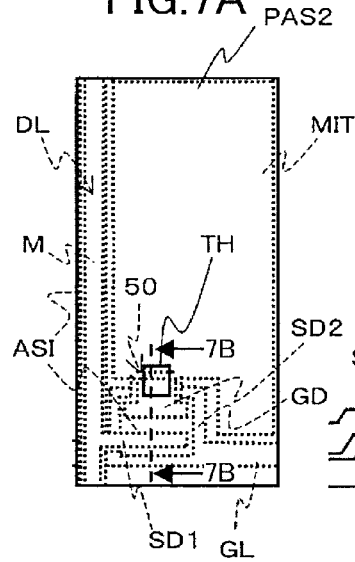
FIG. 7A is a view showing a manufacturing step of the TFT substrate shown in FIG. 3.
Figure 7B:
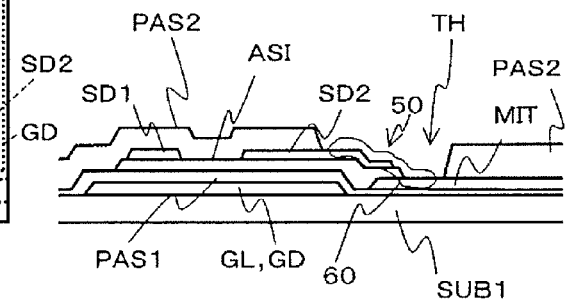
FIG. 7B is a cross-sectional view of the structure shown in FIG. 7A taken along a line 7B-7B.

Next, the second insulation layer PAS2 and the contact holes TH are formed (see FIG. 7A and FIG. 7B). To be more specific, the second insulation layer PAS2 is formed between the pixel electrodes MIT and the common electrodes CT, that is, the second insulation layer PAS2 is formed over the video signal lines DL, the drain electrodes SD1, the source electrode SD2 and the pixel electrodes MIT, while the contact holes TH are formed by etching treatment using a photolithography method. The joining portion 60 is exposed by the contact hole TH.

The contact holes TH are formed in the second insulation layer PAS2 which is an insulation layer arranged close to a surface of the TFT substrate 20 on a liquid-crystal-material-40 side and hence, the contact holes TH can be formed along with the contact holes formed in terminals used for connection with the data drive circuit 11 and the scanning drive circuit 12 (not shown in the drawing). That is, it is unnecessary to provide a step exclusively provided for forming the contact holes TH.

Figure 8B:
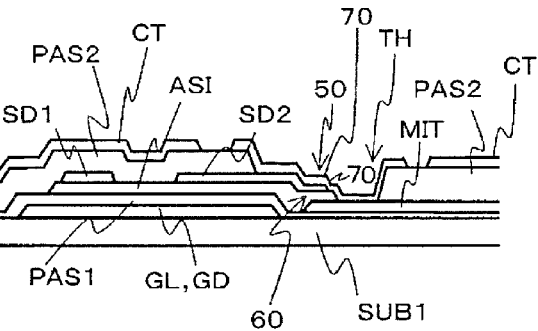
FIG. 8B is a cross-sectional view of the structure shown in FIG. 8A taken along a line 8B-8B.
Figure 8A:
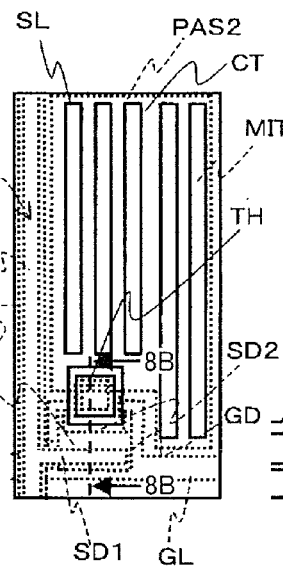
FIG. 8A is a view showing a manufacturing step of the TFT substrate shown in FIG. 3.

Next, the common electrodes CT are formed over the second insulation layer PAS2 (see FIG. 8A and FIG. 8B). In forming the common electrodes CT, a conductive film 70 made of ITO is formed over the second insulation layer PAS2, and etching treatment using a photolithography method is applied to the conductive film 70 thus forming the common electrodes CT each having slits SL. Further, the conductive film 70 is formed over the whole surface of the contact hole TH and hence, the joining portion 60 which is exposed by the contact hole TH is covered by the conductive film 70. Due to such treatment, the pixel electrode MIT and the source electrode SD2 are connected with each other in a conductive state.

In the liquid crystal display device 1 and the manufacturing method thereof according to the embodiment of the present invention, the source electrodes SD2 each of which includes the overlapping portion 50 which is the stacked portion constituted of the semiconductor layer ASI and the metal layer M formed over the surface of the semiconductor layer ASI on the liquid-crystal-material-40 side and is a portion which overlaps the surface of the pixel electrode MIT on the liquid-crystal-material-40 side, the video signal lines DL each of which is formed of the stacked portion constituted of the metal layer M and the semiconductor layer ASI, and the drain electrodes SD1 each of which is formed of the stacked portion constituted of the metal layer M and the semiconductor layer ASI are formed, the contact holes TH each of which exposes the joining portion 60 which is the portion leading to the surface of the pixel electrode MIT on the liquid-crystal-material-40 side from the surface of the source electrode SD2 on the liquid-crystal-material-40 side via the edge portion of the overlapping portion 50 are formed in the second insulation layer PAS2, and the conductive film 70 which is formed into the common electrode CT is formed over the joining portion 60 exposed by the contact hole TH.

In this manner, after forming the pixel electrode MIT, the video signal lines DL, the semiconductor layer ASI, the drain electrodes SD1 and the source electrode SD2 can be formed by collective etching treatment. Accordingly, a disconnection defect of the video signal lines DL can be reduced, and the number of photo masks to be used can be suppressed to 5 sheets.

Further, the semiconductor layers ASI are formed after forming the scanning signal lines GL and hence, the accuracy in mask alignment can be easily acquired compared to a case where the scanning signal lines GL are formed after forming the semiconductor layers ASI.

Accordingly, a yield can be enhanced while reducing a manufacturing cost, and a process design can be easily provided.

Further, in the liquid crystal display device 1 and the manufacturing method thereof according to the embodiment of the present invention, the contact holes TH are formed in the second insulation layer PAS2 which is an insulation layer close to the surface of the TFT substrate 20 on the liquid-crystal-material-40 side and hence, the contact holes TH can be formed along with the formation of other contact holes formed in the terminals on the TFT substrate 20. That is, it is unnecessary to provide a step for forming the contact holes TH thus easily providing a process design eventually.

In the liquid crystal display device 1 and the manufacturing method thereof according to the embodiment of the present invention, the conductive film 70 formed on the common electrode CT is formed on the joining portion 60 exposed by the contact hole TH and hence, at the time of forming the common electrode CT, the source electrode SD2 and the pixel electrode MIT can be connected with each other in a conductive state. That is, it is unnecessary to provide a step for connecting the source electrode SD2 and the pixel electrode MIT in a conductive state whereby it is possible to easily provide a process design eventually.

[Modification]

Figure 9:
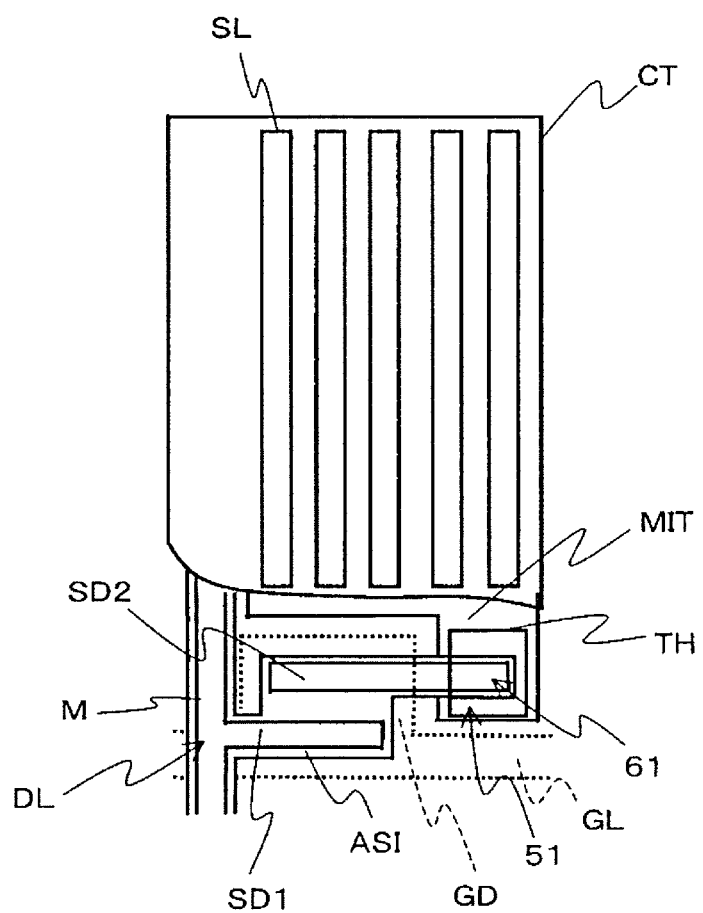
FIG. 9 is a view showing a liquid crystal display device according to a modification of the embodiment of the present invention.

Next, a liquid crystal display device 1 according to a modification of the embodiment of the present invention is explained in conjunction with FIG. 9. FIG. 9 is a view showing the liquid crystal display device 1 according to the modification of the embodiment of the present invention. In the liquid crystal display device 1 according to the embodiment of the present invention, exemplified is the constitution where the overlapping portion 50 overlaps the pixel electrode MIT in the extending direction of the video signal lines DL and the contact hole TH is formed at the position where the joining portion 60 formed by the overlapping portion 50 is exposed. In the liquid crystal display device 1 according to the modification, as shown in the drawing, an overlapping portion 51 overlaps the pixel electrode MIT in the direction orthogonal to the extending direction of the video signal line DL, and the contact hole TH is formed at a position where an upper portion of a joining portion 61 formed by the overlapping portion 51 is opened. This modification can also acquire the substantially same advantageous effects as the embodiment.

In the embodiment of the present invention, the constitution where the slits SL having the longitudinal direction thereof arranged in the extending direction of the video signal line DL are formed in the common electrode CT is exemplified. However, a shape of the slits SL is not limited to such a shape. For example, slits SL arranged in the direction which obliquely intersects the extending direction of the video signal lines DL may be formed in the common electrode CT.

Further, in the embodiment of the present invention, the constitution where the whole surface of the contact hole TH which constitutes the opening portion is covered with the conductive film 70 is exemplified. However, the present invention is not limited to such a constitution. That is, it is sufficient that at least the joining portion 60 is covered with the conductive film 70.

Although the square columnar contact hole TH is exemplified as the opening portion in the embodiment of the present invention, the present invention is not limited to such an opening portion. For example, a circular columnar contact hole may be used as the opening portion.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
a first insulation substrate and a second insulation substrate which hold a liquid crystal material therebetween;
a pixel electrode;
a common electrode; and
a thin film transistor provided on the first insulation substrate, the thin film transistor having a semiconductor layer, a first electrode connected with a video signal line, and a second electrode connected with the pixel electrode;
wherein the semiconductor layer overlaps and is in physical contact with the pixel electrode at an overlapping portion so that the pixel electrode at the overlapping portion is disposed between the first insulation substrate and the semiconductor layer; and
wherein a part of the pixel electrode, a part of the semiconductor layer, and a part of the second electrode are stacked on the first insulation substrate in this order at the overlapping portion.

2. A liquid crystal display device, comprising:
a first insulation substrate and a second insulation substrate which hold a liquid crystal material therebetween;
a pixel electrode;
a common electrode; and
a thin film transistor which has a semiconductor layer, a first electrode connected with a video signal line, and a second electrode connected with the pixel electrode;
wherein the semiconductor layer overlaps and is in physical contact with the pixel electrode; and
wherein a part of the pixel electrode, a part of the semiconductor layer, and a part of the second electrode are stacked at an overlapping portion;
wherein an insulation layer is formed on the pixel electrode; and
wherein the insulation layer has an opening which exposes the overlapping portion.

3. The liquid crystal display device according to claim 2, wherein a conductive film is formed over the overlapping portion; and
wherein the conductive film is on and in physical contact with the pixel electrode at a first portion, and with the second electrode at a second portion which is different from the first portion.

4. The liquid crystal display device according to claim 3, wherein the conductive film covers the whole surface of the opening of the insulation layer.

5. The liquid crystal display device according to claim 3, wherein the conductive film is in physical contact with an edge portion of the semiconductor layer and with an edge portion of the second electrode.

6. The liquid crystal display device according to claim 3, wherein the insulation layer is formed between the pixel electrode and the common electrode; and wherein the conductive film and the common electrode are formed at a same layer.

* * * * *